(12) United States Patent
Albrecht et al.

(10) Patent No.: US 8,003,236 B2
(45) Date of Patent: *Aug. 23, 2011

(54) METHOD FOR MAKING A MASTER MOLD WITH HIGH BIT-ASPECT-RATIO FOR NANOIMPRINTING PATTERNED MAGNETIC RECORDING DISKS, MASTER MOLD MADE BY THE METHOD, AND DISK IMPRINTED BY THE MASTER MOLD

(75) Inventors: Thomas R. Albrecht, San Jose, CA (US); Barry Cushing Stipe, San Jose, CA (US); Henry Hung Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 471 days.

This patent is subject to a terminal disclaimer.

(21) Appl. No.: 12/141,060

(22) Filed: Jun. 17, 2008

(65) Prior Publication Data

US 2009/0310256 A1 Dec. 17, 2009

(51) Int. Cl.
*G11B 5/64* (2006.01)

(52) U.S. Cl. ......... 428/826; 428/800; 428/817; 428/836

(58) Field of Classification Search .......... 428/826–837; 360/15–17, 135
See application file for complete search history.

(56) References Cited

U.S. PATENT DOCUMENTS

| | | | |
|---|---|---|---|
| 5,766,718 A | 6/1998 | Matsuda et al. | |
| 5,930,065 A * | 7/1999 | Albrecht et al. | 360/72.2 |
| 6,042,998 A | 3/2000 | Brueck et al. | |
| 6,303,205 B1 * | 10/2001 | Tanaka et al. | 428/848.1 |
| 6,421,195 B1 | 7/2002 | Rubin et al. | |
| 6,667,237 B1 | 12/2003 | Metzler | |
| 6,754,016 B2 * | 6/2004 | Messner et al. | 360/48 |

(Continued)

FOREIGN PATENT DOCUMENTS

| | | |
|---|---|---|
| JP | 2000113533 | 4/2000 |
| WO | 2007058324 | 5/2007 |

OTHER PUBLICATIONS

Helian et al. "Lowering aspect ratio of patterned islands to achieve ultrahigh storage densities." Journal of Magnetism and Magnetic Materials. 233. (2001): 305-310.*

(Continued)

*Primary Examiner* — Holly Rickman
*Assistant Examiner* — Lisa Chau
(74) *Attorney, Agent, or Firm* — Thomas R. Berthold

(57) ABSTRACT

A method for making a master mold to be used for nanoimprinting patterned-media magnetic recording disks results in a master mold having topographic pillars arranged in a pattern of annular bands of concentric rings. The ratio of circumferential density of the pillars to the radial density of the concentric rings in a band is greater than 1. The method uses sidewall lithography to first form a pattern of generally radially-directed pairs of parallel lines on the master mold substrate, with the lines being grouped into annular zones or bands. The sidewall lithography process can be repeated, resulting in a doubling of the number of lines each time the process is repeated. Conventional lithography is used to form concentric rings over the radially-directed pairs of parallel lines. After etching and resist removal, the master mold has pillars arranged in circular rings, with the rings grouped into annular bands. The master mold may be used to nanoimprint the disks, resulting in disks having a BAR greater than 1, wherein BAR is the ratio of data track spacing in the radial direction to the data island spacing in the circumferential direction.

5 Claims, 13 Drawing Sheets

U.S. PATENT DOCUMENTS

| | | | |
|---|---|---|---|
| 7,080,596 B2 | | 7/2006 | Lee et al. |
| 2002/0168548 A1* | | 11/2002 | Sakurai et al. .......... 428/694 BR |
| 2005/0094549 A1* | | 5/2005 | Hieda et al. .................... 369/277 |
| 2006/0276043 A1 | | 12/2006 | Johnson et al. |
| 2007/0092650 A1 | | 4/2007 | Albrecht et al. |
| 2007/0121375 A1 | | 5/2007 | Sewell |
| 2008/0002295 A1* | | 1/2008 | Sakurai et al. ................. 360/131 |
| 2010/0233517 A1* | | 9/2010 | Albrecht .................... 428/848.5 |

OTHER PUBLICATIONS

Bandic et al., "Patterned magnetic media: impact of nanoscale patterning on hard disk drives", Solid State Technology S7+ Suppl. S, Sep. 2006.

Terris et al., "Topical Review: Nanofabricated and self-assembled magnetic structures as data storage media", J. Phys. D: Appl. Phys. 38 (2005) R199-R222.

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731 1736.

Kwon et al., "Fabrication of Metallic Nanodots in Large-Area Arrays by Mold-to-Mold Cross Imprinting," Nano Letters, vol. 5, No. 12, pp. 2557-2562 (2005).

Bencher, "SAPD the Best Option for 32nm NAND Flash", Nanochip Technology Journal, Issue Two 2007, Oct. 25, 2007.

* cited by examiner

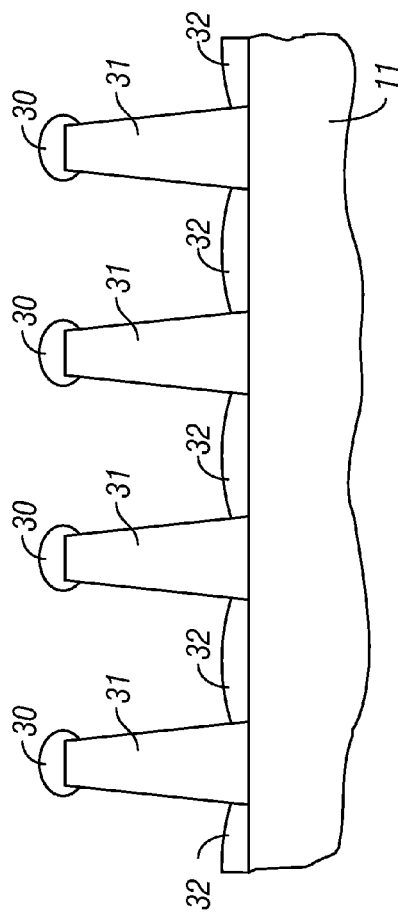
FIG. 3
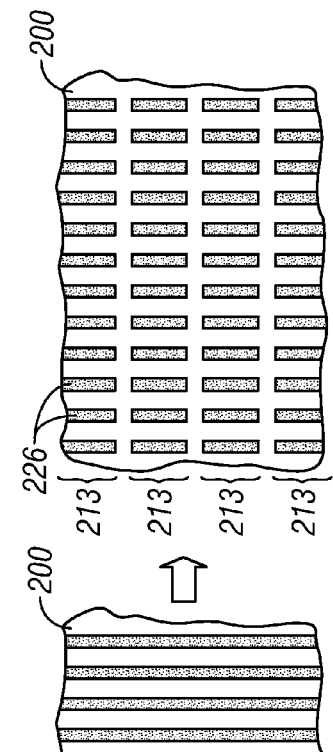
FIG. 4A
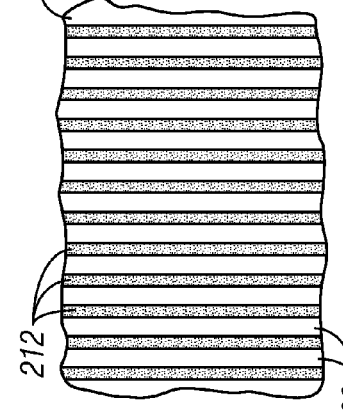
FIG. 4B
FIG. 4C

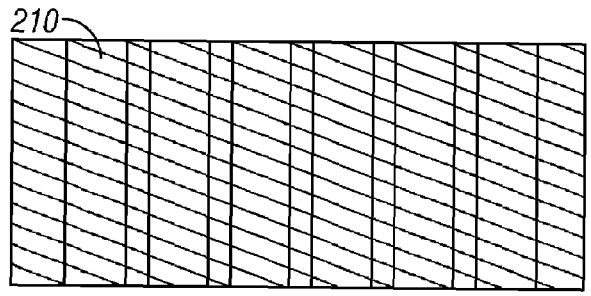
FIG. 7A
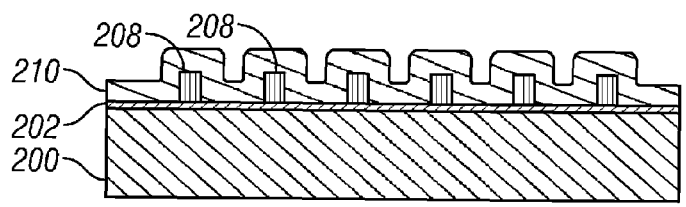
FIG. 7B
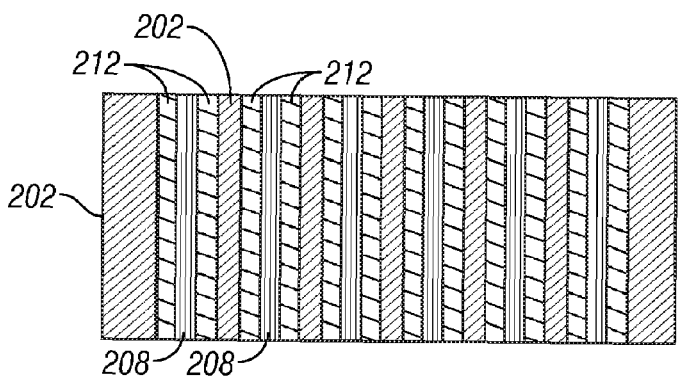
FIG. 8A
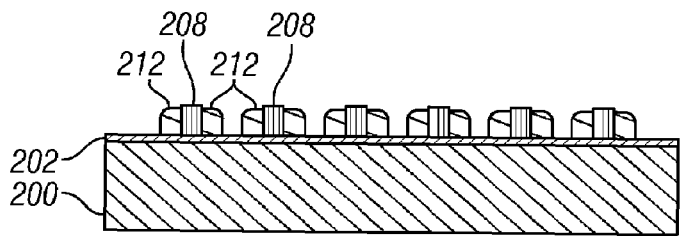
FIG. 8B
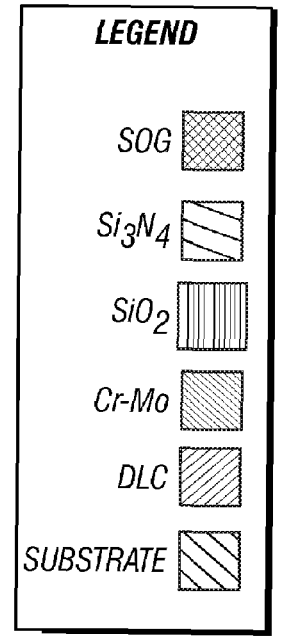

METHOD FOR MAKING A MASTER MOLD WITH HIGH BIT-ASPECT-RATIO FOR NANOIMPRINTING PATTERNED MAGNETIC RECORDING DISKS, MASTER MOLD MADE BY THE METHOD, AND DISK IMPRINTED BY THE MASTER MOLD

BACKGROUND OF THE INVENTION

1. Field of the Invention

This invention relates generally to patterned-media magnetic recording disks, wherein each data bit is stored in a magnetically isolated data island on the disk, and more particularly to a method for making a master mold to be used for nanoimprinting the patterned-media disks.

2. Description of the Related Art

Magnetic recording hard disk drives with patterned magnetic recording media have been proposed to increase data density. In patterned media, the magnetic recording layer on the disk is patterned into small discrete magnetic data islands separated by nonmagnetic spaces and arranged in concentric data tracks. To produce the required magnetic isolation of the patterned data islands, the magnetic moment of spaces between the islands must be destroyed or substantially reduced to render these spaces essentially nonmagnetic. In one type of patterned media, the data islands are elevated regions or pillars that extend above "trenches" and magnetic material covers both the pillars and the trenches, with the magnetic material in the trenches being rendered nonmagnetic, typically by "poisoning" with a material like silicon (Si). Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer.

One proposed method for fabricating patterned-media disks is by nanoimprinting with a template or mold, sometimes also called a "stamper", that has a topographic surface pattern. In this method the magnetic recording disk substrate with a polymer film on its surface is pressed against the mold. The polymer film receives the reverse image of the mold pattern and then becomes a mask for subsequent etching of the disk substrate to form the pillars on the disk. The magnetic layer and other layers needed for the magnetic recording disk are then deposited onto the etched disk substrate and the tops of the pillars to form the patterned-media disk. The mold may be a master mold for directly imprinting the disks. However, the more likely approach is to fabricate a master mold with a pattern of pillars corresponding to the pattern of pillars desired for the disks and to use this master mold to fabricate replica molds. The replica molds will thus have a pattern of holes corresponding to the pattern of pillars on the master mold. The replica molds are then used to directly imprint the disks. Nanoimprinting of patterned media is described by Bandic et al., "Patterned magnetic media: impact of nanoscale patterning on hard disk drives", *Solid State Technology* S7+Suppl. S, September 2006; and by Terris et al., "TOPICAL REVIEW: Nanofabricated and self-assembled magnetic structures as data storage media", *J. Phys. D: Appl. Phys.* 38 (2005) R199-R222.

In patterned media, there are two opposing requirements relating to the bit-aspect-ratio (BAR) of the pattern or array of discrete data islands arranged in concentric tracks. The BAR is the ratio of track spacing or pitch in the radial or cross-track direction to the island spacing or pitch in the circumferential or along-the-track direction, which is the same as the ratio of linear island density in bits per inch (BPI) in the along-the-track direction to the track density in tracks per inch (TPI) in the cross-track direction. The BAR is also equal to the ratio of the radial dimension of the bit cell to the circumferential dimension of the bit cell, where the data island is located within the bit cell. The bit cell includes not only the magnetic data island but also one-half of the nonmagnetic space between the data island and its immediately adjacent data islands. The data islands have an island aspect ratio (IAR) or radial length to circumferential that is generally close to the BAR. The first requirement is that to minimize the resolution requirement for fabricating the islands, it is preferable that the array of islands have a low BAR (about 1). The second requirement is that to allow for a wider write head pole, which is necessary for achieving a high write field to allow the use of high coercivity media for thermal stability, it is preferable that the array of islands have a higher BAR (about 2 or greater). Also, the transition from disk drives with conventional continuous media to disk drives with patterned media is simplified if the BAR is high because in conventional disk drives the BAR is between about 5 to 10. Other benefits of higher BAR include lower track density, which simplifies the head-positioning servo requirements, and a higher data rate.

The making of the master template or mold is a difficult and challenging process. The use of electron beam (e-beam) lithography using a Gaussian beam rotary-stage e-beam writer is viewed as a possible method to make a master mold capable of nanoimprinting patterned-media disks with a BAR of about 1 with a track pitch (island-to-island spacing in the radial or cross-track direction) of about 35 nm, and an island pitch (island-to-island spacing in the circumferential or along-the-track direction) of about 35 nm. If the data islands have a radial length and circumferential width each of about 20 nm for an IAR of 1, then these dimensions generally limit the areal bit density of patterned-media disks to about 500 Gbit/in$^2$. To achieve patterned-media disks with both an ultra-high areal bit density (around 1 Terabits/in$^2$) and a higher BAR, a track pitch of 50 nm and an island pitch of about 12.5 nm will be required, which would result in a BAR of 4. However, a master mold capable of nanoimprinting patterned-media disks with an island pitch of 12.5 nm is not achievable with the resolution of e-beam lithography.

What is needed is a master mold and a method for making it that can result in patterned-media magnetic recording disks with both the required high areal bit density and higher BAR (about 2 or greater).

SUMMARY OF THE INVENTION

The invention is a method for making a master mold to be used for nanoimprinting patterned-media magnetic recording disks with a BAR greater than 1, preferably about 2 or greater. The method uses sidewall lithography to first form a pattern of generally radially-directed pairs of parallel lines on the master mold substrate, with the lines being grouped into annular zones or bands. This is accomplished by first using e-beam lithography to pattern radial ridges on the substrate. Material is then deposited on both sidewalls of the radial ridges and the ridges are then removed, leaving pairs of parallel strips that were originally formed along the sidewalls of the ridges. The strips are used as an etch mask to from the generally radially-directed pairs of parallel lines on the substrate. The sidewall lithography process can be repeated, resulting in a doubling of the number of lines each time the process is repeated. The circumferential density of the radially-directed lines is at least twice the circumferential density of the e-beam patterned radial ridges. Conventional lithography is then used to form concentric rings over the radially-directed pairs of parallel lines. After etching and resist removal, the master mold has pillars arranged in circular rings, with the rings grouped into annular bands. The spacing of the concentric rings is selected so that following the etching process the master mold has an array of pillars with the desired BAR, which is greater than 1, preferably about 2 or greater. The master mold may be used to directly nanoimprint the disks, but more likely is used to make replica molds which are then used to directly nanoimprint the disks.

The invention also relates to a master mold made by the method, as well as to a patterned-media magnetic recording disk formed by a nanoimprinting process using the master mold made by the method.

For a fuller understanding of the nature and advantages of the present invention, reference should be made to the following detailed description taken together with the accompanying figures.

BRIEF DESCRIPTION OF THE DRAWING

FIG. 3 is a side sectional view of one type of a patterned-media disk showing the data islands as elevated, spaced-apart pillars that extend above the disk substrate surface with trenches between the pillars.

FIGS. 4A, 4B and 4C are views of a small portion of one annular band of the master mold at successive stages of the method of making the master mold according to the present invention.

FIGS. 7A and 7B illustrate top and side sectional views, respectively, of a step in a first implementation of this invention wherein sidewall lithography is used to make generally radially-directed lines on the master mold.

FIGS. 8A and 8B illustrate top and side sectional views, respectively, of a step in a first implementation of this invention wherein sidewall lithography is used to make generally radially-directed lines on the master mold.

DETAILED DESCRIPTION OF THE INVENTION

Figure 1:
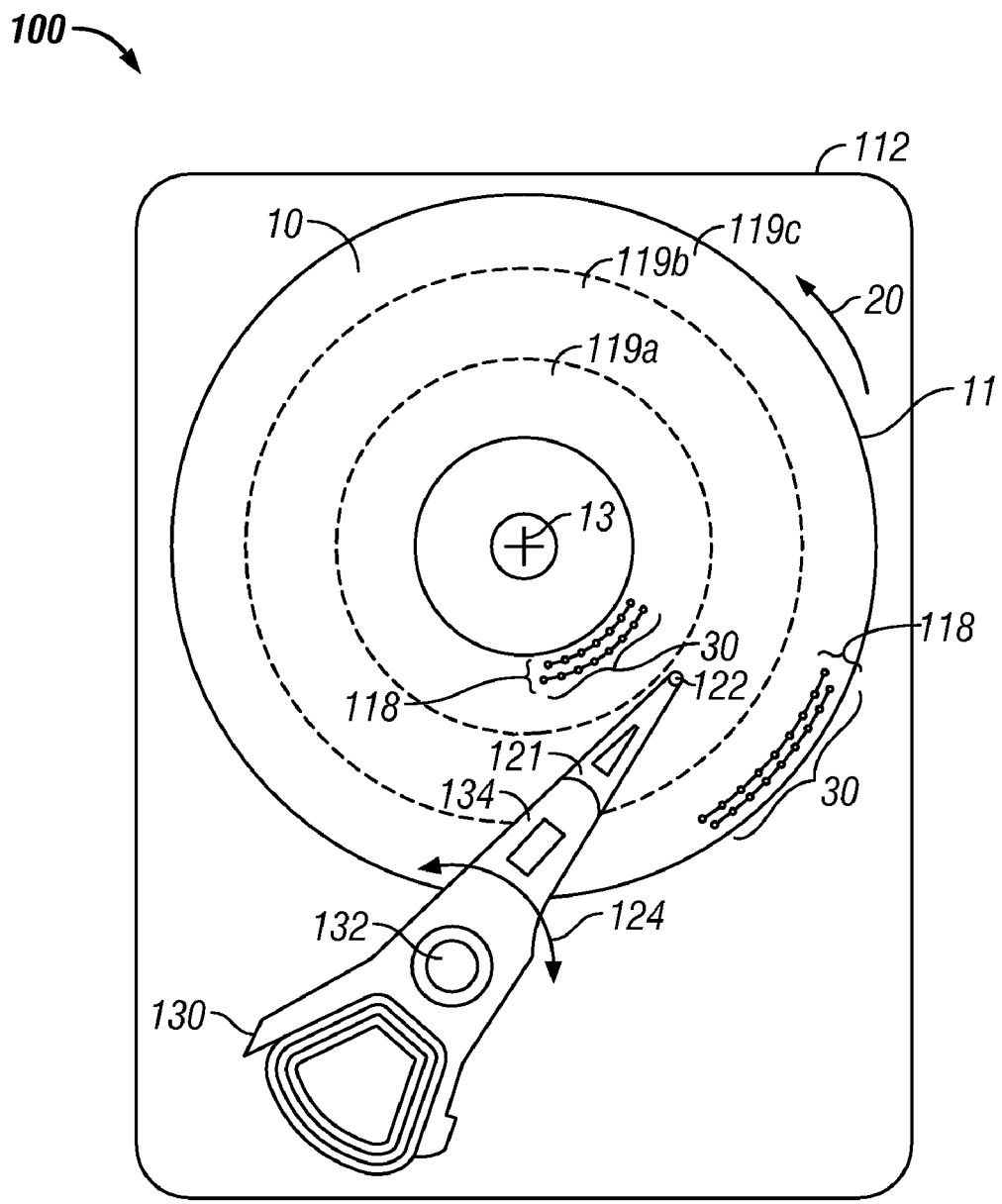
FIG. 1 is a top view of a disk drive with a patterned-media type of magnetic recording disk as described in the prior art.

FIG. 1 is a top view of a disk drive 100 with a patterned magnetic recording disk 10 as described in the prior art. The drive 100 has a housing or base 112 that supports an actuator 130 and a drive motor for rotating the magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A magnetoresistive read head (not shown) and an inductive write head (not shown) are typically formed as an integrated read/write head patterned on the trailing surface of the head carrier 122, as is well known in the art.

The patterned magnetic recording disk 10 includes a disk substrate 11 and discrete data islands 30 of magnetizable material on the substrate 11. The data islands 30 function as discrete magnetic bits for the storage of data and are arranged in radially-spaced circular tracks 118, with the tracks 118 being grouped into annular bands 119a, 119b, 119c. The grouping of the data tracks into annular bands permits banded recording, wherein the angular spacing of the data islands, and thus the data rate, is different in each band. In FIG. 1, only a few islands 30 and representative tracks 118 are shown in the inner band 119a and the outer band 119c. As the disk 10 rotates about its center 13 in the direction of arrow 20, the movement of actuator 130 allows the read/write head on the trailing end of head carrier 122 to access different data tracks 118 on disk 10.

Figure 2A:
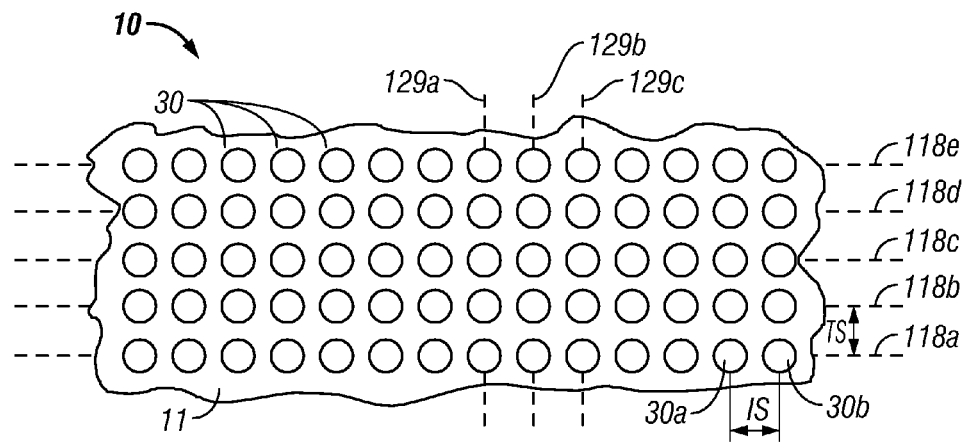
FIG. 2A is a top view of an enlarged portion of a patterned-media type of magnetic recording disk showing the detailed arrangement of the data islands in one of the bands on the surface of the disk substrate.

FIG. 2A is a top view of an enlarged portion of disk 10 showing the detailed arrangement of the data islands 30 in one of the bands on the surface of disk substrate 11 according to the prior art. The islands 30 are shown as being circularly shaped and thus have a BAR of 1. The islands 30 contain magnetizable recording material and are arranged in tracks spaced-apart in the radial or cross-track direction, as shown by tracks 118a-118e. The tracks are typically equally spaced apart by a fixed track pitch or spacing TS. Within each track

118a-118e, the islands 30 are equally spaced apart by a fixed along-the-track island pitch or spacing IS, as shown by typical islands 30a and 30b, where IS is the spacing between the centers of two adjacent islands in a track. The islands 30 are also arranged into radial lines, as shown by radial lines 129a, 129b and 129c that extend from disk center 13 (FIG. 1). Because FIG. 2A shows only a very small portion of the disk substrate 11 with only a few of the data islands, the pattern of islands 30 appears to be two sets of perpendicular lines. However, tracks 118a-118e are concentric rings centered about the center 13 of disk 10 and the lines 129a, 129b, 129c are not parallel lines, but radial lines extending from the center 13 of disk 10. Thus the angular spacing between adjacent islands as measured from the center 13 of the disk for adjacent islands in lines 129a and 129b in a radially inner track (like track 118e) is the same as the angular spacing for adjacent islands in lines 129a and 129b in a radially outer track (like track 118a).

The radial lines (like lines 129a, 129b, 129c) may be perfectly straight radial lines but are preferably arcs or arcuate-shaped radial lines that replicate the arcuate path of the read/write head on the rotary actuator. Such arcuate-shaped radial lines provide a constant phase position of the data islands as the head sweeps across the data tracks. There is a very small radial offset between the read head and the write head, so that the synchronization field used for writing on a track is actually read from a different track. If the islands between the two tracks are in phase, which is the case if the radial lines are arcuate-shaped, then writing is greatly simplified.

Figure 2B:
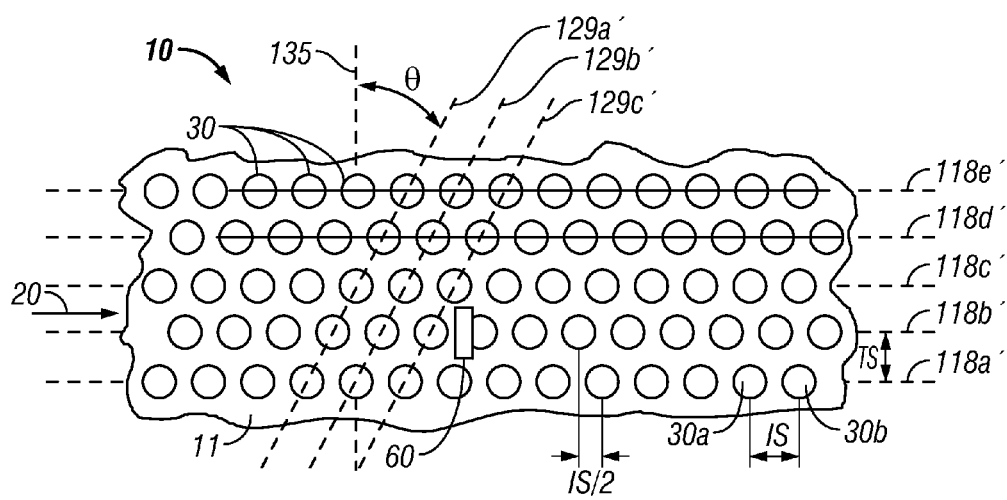
FIG. 2B is a top view of an enlarged portion of a patterned-media type of magnetic recording disk showing a pattern for the data islands different from the pattern of FIG. 2A.

FIG. 2B shows an enlarged portion of disk 10 with a different pattern for data islands 30. Within each track 118a'-118e', the islands 30 are equally spaced apart by a fixed along-the-track island spacing IS, as shown by typical islands 30a, 30b, where IS is the spacing between the centers of two adjacent islands in a track. However, the islands in each track are shifted in the along-the-track direction by one-half the island spacing (IS/2) from the islands in adjacent tracks. For example, the islands in track 118b' are shifted a distance IS/2 from the islands in adjacent tracks 118a' and 118c'. As a result, the islands 30 are also arranged in radial lines that are not purely radial, but generally radially-directed, as shown by lines 129a', 129b', 129c. The lines 129a', 129b', 129c' form an acute angle θ with a purely radial line 135. The lines 129a', 129b', 129c' are not parallel lines, but lines with a constant angular spacing, i.e., the angular spacing as measured from the center 13 of the disk for adjacent bits in lines 129a' and 129b' in a radially inner track (like track 118e') is the same as the angular spacing for adjacent bits in lines 129a' and 129b' in a radially outer track (like track 118a').

FIG. 2B also shows a head element 60, which may represent either a read head or a write head, aligned over the center of track 118b'. If the element 60 is a read head, then as the disk rotates in the direction of arrow 20, the magnetized data islands in track 118b' will pass the head element 60 and generate a specific readback signal, depending on the directions of magnetization of the individual islands. However, because the islands in adjacent tracks 118a' and 118c' are shifted in the along-the-track direction by a distance IS/2 from the islands in track 118b', any readback signal interference from these adjacent tracks will be out of phase with the readback signal from track 118b', the track being read. Thus the pattern of data islands shown in FIG. 2B results in a reduced error rate for the data being read.

It may also be desirable to have the islands in the pattern of FIG. 2B be arranged in arcuate-shaped lines for the same reason as explained above for the pattern of FIG. 2A. However, in this case the islands in alternate tracks form arcuate-shaped lines in the radial direction. Thus line 135, which intersects islands in alternate rows 118a', 118c' and 118e', would have the desired arcuate shape that replicates the path of the read/write head as the rotary actuator moves the head across the tracks. The lines 129a', 129b' and 129c' would have thus not be perfectly straight but would have a shape that results in the islands in alternate tracks forming the desired arcuate-shaped line.

Patterned-media disks like that shown in FIGS. 2A and 2B may be longitudinal magnetic recording disks, wherein the magnetization directions in the magnetizable recording material are parallel to or in the plane of the recording layer in the islands, or perpendicular magnetic recording disks, wherein the magnetization directions are perpendicular to or out-of-the-plane of the recording layer in the islands. To produce the required magnetic isolation of the patterned data islands, the magnetic moment of the regions between the islands must be destroyed or substantially reduced to render these spaces essentially nonmagnetic. Patterned media may be fabricated by any of several known techniques. In one type of patterned media, the data islands are elevated, spaced-apart pillars that extend above the disk substrate surface to define troughs or trenches on the substrate surface between the pillars. This type of patterned media is shown in the sectional view in FIG. 3. In this type of patterned media the substrate 11 with a pre-etched pattern of pillars 31 and trenches or regions between the pillars can be produced with relatively low-cost, high volume nanoimprinting process using a master template or mold. The magnetic recording layer material is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material may be spaced far enough from the read/write head to not adversely affect reading or writing to the recording layer material in islands 30, or the trenches may be rendered nonmagnetic by "poisoning" with a material like Si. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

However, the making of the master template or mold is a difficult and challenging process. The use of electron beam (e-beam) lithography using a Gaussian beam rotary-stage e-beam writer is viewed as a possible method to make the master mold. However, to achieve patterned-media disks with both higher areal bit density (around 1 Tbit/in$^2$) and a higher BAR, a track pitch of 50 nm and an island pitch of about 12.5 nm will be required, which would result in a BAR of 4. A master mold capable of nanoimprinting patterned-media disks with an island pitch of 12.5 nm is difficult to fabricate due to the limited resolution of e-beam lithography.

The present invention relates to a method for making a master mold that is used in the nanoimprinting process to make patterned-media disks with a BAR greater than 1, preferably about 2 or greater. The master mold may be used to directly nanoimprint the disks, but more likely is used to make replica molds which are then used to directly nanoimprint the disks. The method uses e-beam lithography to pattern radial ridges on the master mold substrate. Material is then deposited on both sidewalls of the radial ridges and then the ridges are removed, leaving pairs of parallel strips that were originally formed along the sidewalls of the ridges. The strips are used as an etch mask to form generally radially-directed pairs of parallel lines on the substrate, with the lines being grouped into annular zones or bands. The sidewall lithography process can be repeated, resulting in a doubling of the number of lines each time the process is repeated. The circumferential density of the radially-directed lines is at least twice the circumferential density that could be achieved by using e-beam lithography alone. Conventional lithography is then used to form concentric rings over the radially-directed pairs of parallel lines. After etching and resist removal, the master mold has pillars arranged in circular rings, with the rings grouped into annular bands. The spacing of the concentric rings is selected so that following the etching process the master mold has an array of pillars with the desired BAR, which is greater than 1, preferably about 2 or greater. Because the invention allows the circumferential density of the master mold pillars to be at least doubled from what could be achieved with just e-beam lithography, the subsequently nanoimprinted patterned-media disks can have both a high BAR (greater than 1 and preferably about 2 or greater) and an ultra-high areal density.

A high-level representation of the method is illustrated in FIGS. 4A-4C, which show a small portion of one annular band of the master mold with the radial or cross-track direction being vertical and the circumferential or along-the-track direction being horizontal. In FIG. 4A, the first step is to create radial ridges 208 on substrate 200 at a density achievable by conventional e-beam or other lithography. Next, in FIG. 4B, the density of ridges is multiplied by two by sidewall lithography. The sidewall lithography process results in the deposition of material on both sidewalls of each ridge 208 so that after removal of the ridges 208, a pair of radially-directed parallel strips 212 remains in place of each ridge 208. The sidewall lithography process can be repeated, resulting in the number of strips being doubled each time the process is repeated. In the repeat process, the first ridges are primary ridges and the first strips are primary strips that are used as an etch mask to form secondary ridges. Secondary strips are formed on the sidewalls of the secondary ridges, after which the secondary ridges are removed, leaving secondary strips that are four times the number of primary ridges. Repeating the sidewall lithography process a number of times may be especially useful when the starting density of the radial ridges 208 is low, such as might be the case when optical lithography is used instead of e-beam lithography to create the starting pattern of ridges 208. Next, in FIG. 4C, a second conventional e-beam or other lithography step is performed to cut the radial strips 212 into segments 213 which correspond to the data tracks on the disks that will be nanoimprinted. This results in pillars 226 that correspond to the individual data islands on the disks that will be nanoimprinted. The array of pillars 226 has a BAR greater than 1, preferably about 2 or greater. The pillars 226 will serve as an etch mask for etching the substrate 200, so that after the pillars 226 are removed, the substrate 200 will have raised pillars of substrate material corresponding to the individual data islands on the disks that will be nanoimprinted.

Sidewall lithography is a known process for creating two parallel line features using a single line feature as a starting point. This is accomplished by depositing material on both sides of a ridge feature, and then removing the ridge, leaving two parallel ridges or strips that were originally formed along the two sides of the single original ridge. Sidewall lithography is used in semiconductor manufacturing to from sidewall spacers as a hardmask to double the printed line density, and has been referred to as self-aligned double patterning (SAPD), as described by C. Bencher, "SAPD The Best Option for 32 nm NAND Flash", *Nanochip Technology Journal*, Issue Two 2007, Oct. 25, 2007. Sidewall lithography has been used to make arrays of metallic dots arranged in a rectangular pattern of two sets of intersecting parallel lines, as described by Kwon et al., "Fabrication of Metallic Nanodots in Large-Area Arrays by Mold-to-Mold Cross Imprinting," *Nano Letters*, Vol. 5, No. 12, pp. 2557-2562 (2005). However, this simple arrangement of dots is not useful for patterned-media disks. For patterned-media disks the dots must be arranged in circular tracks, not straight lines. Also, sidewall lithography generates parallel lines, whereas the dots in patterned-media disks must be arranged in non-parallel radially-directed lines, like those shown in FIGS. 2A and 2B. However, the data islands in patterned-media disks must be arranged in non-parallel radially-directed lines, like those shown in FIGS. 2A and 2B. Pending application Ser. No. 11/782,664, filed Jul. 25, 2007 and assigned to the same assignee as this application, describes a method for making a master mold by using a first sidewall lithography process to form a pattern of concentric rings and a second sidewall lithography process to form a pattern of generally radially-directed pairs of parallel lines. After an etching process the master mold then has pillars of substrate material arranged in a pattern of concentric rings and generally radially-directed pairs of parallel lines, with the pillars and thus the array of data islands of the subsequently nanoimprinted patterned-media disks having a BAR of 1.

One implementation of the method of this invention for making the master mold will be explained with FIGS. 5A-5B through FIGS. 12A-12B. In each of the figures, figure A is a top view and figure B is a side sectional view.

Figure 5A:
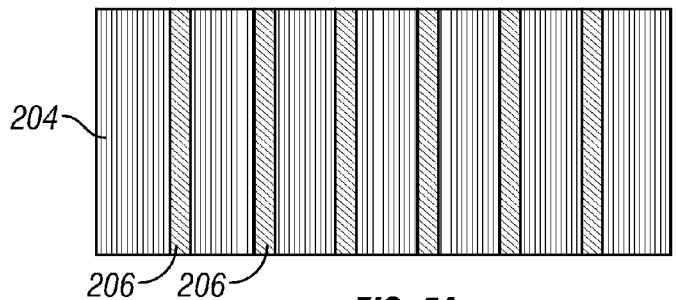
FIGS. 5A and 5B illustrate top and side sectional views, respectively, of a step in a first implementation of this invention wherein sidewall lithography is used to make generally radially-directed lines on the master mold.
Figure 5B:
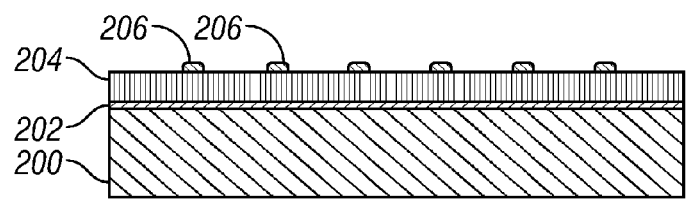

In FIGS. 5A-5B, a Si substrate 200 is coated first with a thin layer 202 (~10 nm) of diamond-like carbon (DLC) and then with a somewhat thicker layer 204 (~30 nm) of $SiO_2$. A resist layer (not shown) is deposited on the $SiO_2$ and high resolution electron beam (e-beam) lithography is then performed, leaving a resist pattern with square ridges separated by narrow grooves. A Cr—Mo alloy layer is then deposited, followed by a conventional lift-off process, leaving thin (~10 nm) narrow parallel stripes 206 of Cr—Mo in a regular one-dimensional array. For this example, the spacing or pitch of the stripes 206 in the circumferential or along-the-track direction may be about 2F and the width of the stripes 206 may be about F/2 where "F" is defined as the half the pitch of the lines written by e-beam lithography. For example, F may be about 20 nm. The parallel stripes 206 of Cr—Mo are oriented in the radial direction.

Figure 6A:
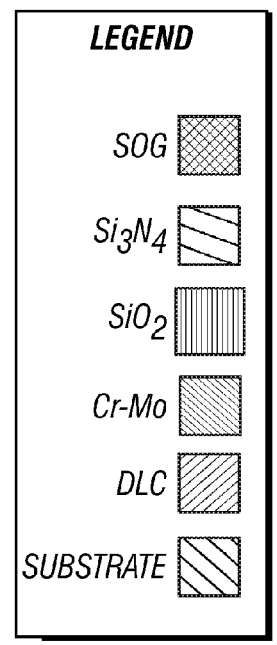
FIGS. 6A and 6B illustrate top and side sectional views, respectively, of a step in a first implementation of this invention wherein sidewall lithography is used to make generally radially-directed lines on the master mold.
Figure 6A:
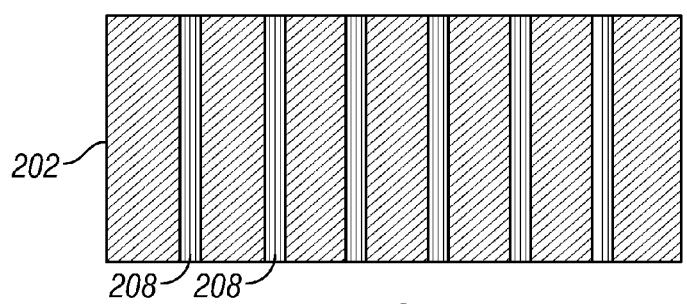
Figure 6B:
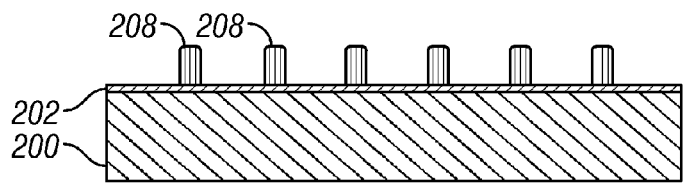

In FIGS. 6A-6B, anisotropic reactive ion etching (RIE) is performed. For example, a fluorine-based chemistry is used to etch through the $SiO_2$ layer, using the Cr—Mo stripes 206 as an etch mask. This leaves radial ridges 208 of $SiO_2$ on top of the DLC layer 202. The remaining Cr—Mo material is then stripped with a wet etch, leaving radial ridges 208 corresponding generally to the step shown in FIG. 4A.

In FIGS. 7A-7B, a conformal deposition process such as chemical vapor deposition is used to coat the $SiO_2$ ridges 208, their sidewalls, and the spaces between them with an F/2 thick layer 210 of $Si_3N_4$.

In FIGS. 8A-8B, an anisotropic fluorine-based RIE process is used to etch through and remove the $Si_3N_4$ in the regions over the tops of the $SiO_2$ ridges 208 and the regions between the ridges 208, leaving a pair of parallel strips 212 of $Si_3N_4$ abutting the two sidewalls of each ridge 208. If the process is perfectly anisotropic (i.e., it etches straight downward only, with no sidewall attack), the remaining $Si_3N_4$ strips 212 will have a circumferential width of about F/2. Each pair of $Si_3N_4$ strips 212 is aligned in the radial direction.

Figure 9A:
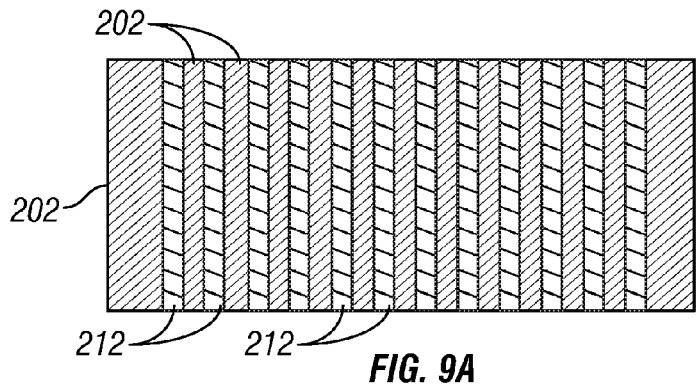
FIGS. 9A and 9B illustrate top and side sectional views, respectively, of a step in a first implementation of this invention wherein sidewall lithography is used to make generally radially-directed lines on the master mold.
Figure 9B:
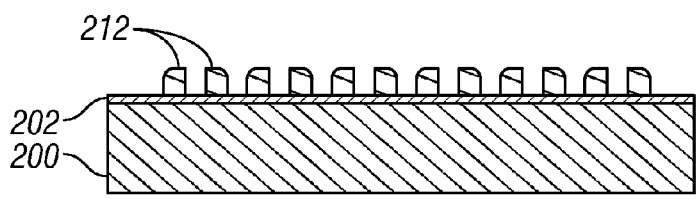

In FIGS. 9A-9B, the $SiO_2$ ridges 208 are removed by a wet etch (e.g., concentrated potassium hydroxide solution), leaving an array of $Si_3N_4$ strips 212 on DLC layer 202 with a circumferential pitch of about F, which is about half the pitch of the original $SiO_2$ ridges 208. The pitch and width of the original ridges 208, the thickness of the $Si_3N_4$ deposition, and the anisotropy of the RIE step may all be optimized to provide the desired dimensions and pitch of the strips 212. The resulting structure in FIGS. 9A-9B is a plurality of pairs of $Si_3N_4$ strips 212, with each pair being aligned in the radial direction, and corresponds generally to the step shown in FIG. 4B.

Figure 10A:
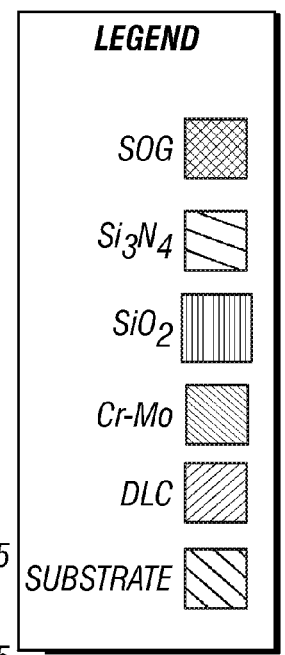
FIGS. 10A and 10B illustrate top and side sectional views, respectively, of a step in a first implementation of this invention to make concentric rings on the master mold.
Figure 10A:
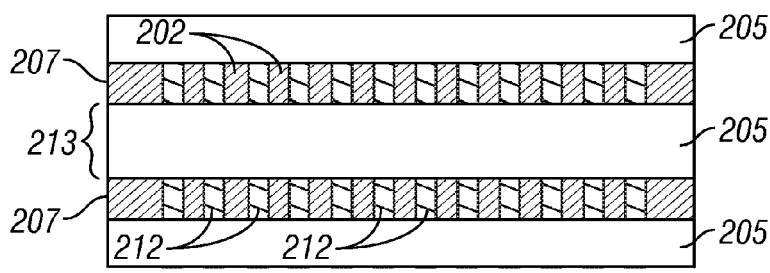
Figure 10B:
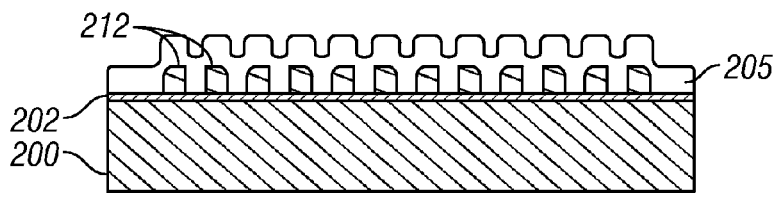

Next, a second conventional e-beam or other lithography step is performed to cut the radial strips 212 into segments that will correspond to the tracks on the patterned-media disks that will be nanoimprinted by the master mold. In FIGS. 10A-10B, the structure is coated with a layer of e-beam resist 205. Then the resist 205 is exposed in a rotary-stage e-beam tool to expose narrow concentric boundary regions 207 that correspond to the boundaries between the tracks of the patterned-media disks to be nanoimprinted. The resist 205 may be a positive e-beam resist like poly methyl methacrylate (PMMA) or ZEP520A from Zeon Chemicals, L.P. After developing, this will leave circumferential segments 213, which correspond to the tracks on the patterned-media disks to be nanoimprinted, covered with resist 205, with the boundary regions 207 between tracks not covered with resist. By adjusting the exposure and developing conditions, the width of the uncovered boundary regions can be adjusted as desired.

Figure 11A:
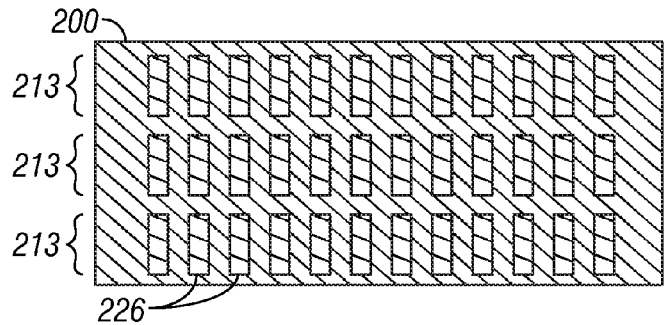
FIGS. 11A and 11B illustrate top and side sectional views, respectively, of a step in a first implementation of this invention to make concentric rings on the master mold.
Figure 11B:
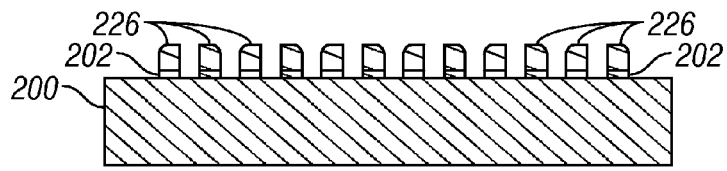

In FIGS. 11A-11B, a fluorine-based reactive-ion-etch (RIE) is used to etch the exposed $Si_3N_4$ in the boundary regions 207. Then the resist 205 is removed in a wet etch process, like hot N-methyl pyrrolidone (NMP), or a dry etch process, like oxygen RIE. Then an oxygen RIE is used to etch the carbon film 202 from the substrate 200 in the regions between the $Si_3N_4$ pillars 226. This leaves the structure as shown in FIGS. 11A-11B, with the $Si_3N_4$ strips 212 having been cut into $Si_3N_4$ pillars 226, with the $Si_3N_4$ pillars 226 being arranged in circumferential segments 213 which correspond to the concentric tracks of the patterned-media disks to be nanoimprinted.

Figure 12A:
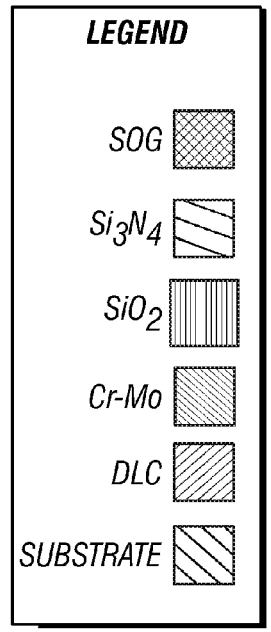
FIGS. 12A and 12B illustrate top and side sectional views, respectively, of the master mold after fabrication according to a first implementation of the method of this invention.
Figure 12A:
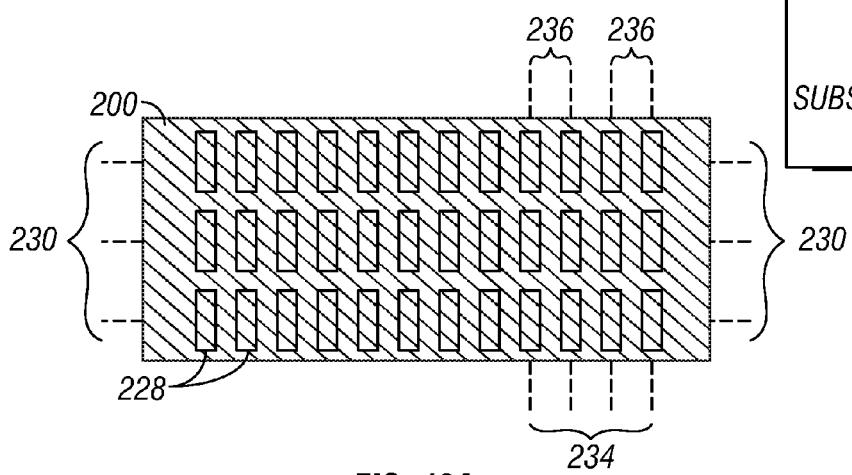
Figure 12B:

In FIGS. 12A-12B, the process is completed by performing an anisotropic fluorine-based RIE etch of the substrate 200, using the $Si_3N_4$ pillars 226 and underlying carbon 202 from FIGS. 11A-11B as the etch mask. After etching to the desired depth, an isotropic oxygen RIE is used to remove the DLC layer 202, which releases any remaining $Si_3N_4$ from pillars 226 to be washed away in a subsequent cleaning step. At the completion of the process, the substrate 200 includes a two-dimensional array of pillars 228 of substrate material. The result is the master mold with an array of pillars 228 patterned into concentric rings 230 and lines 234. The lines 234 are formed into pairs 236 of parallel lines, but the pairs 236 are not parallel but generally radially-directed. Each of the pillars 228 has a IAR preferably of about 2 or greater. The structure in FIGS. 12A-12B thus corresponds generally to the step shown in FIG. 4C.

The pillars are circumferentially spaced apart by a distance of about F and have a circumferential width of about F/2. The F pillar spacing or pitch in the circumferential direction is half of that used in the e-beam lithography step, which defined a 2F feature pitch if only one sidewall lithography step is used to form the radial strips.

The master mold shown in FIGS. 12A-12B is a pillar-type master mold that can be used to make replica molds. The replica molds will thus have hole patterns corresponding to the pillar pattern of the master mold. When the replica mold is used to make the disks, the resulting disks will then have a pillar pattern, with the pillars corresponding to the data islands. However, the master mold may alternatively be a hole-type of master mold that can be used to directly nanoimprint the disks.

Figure 13:
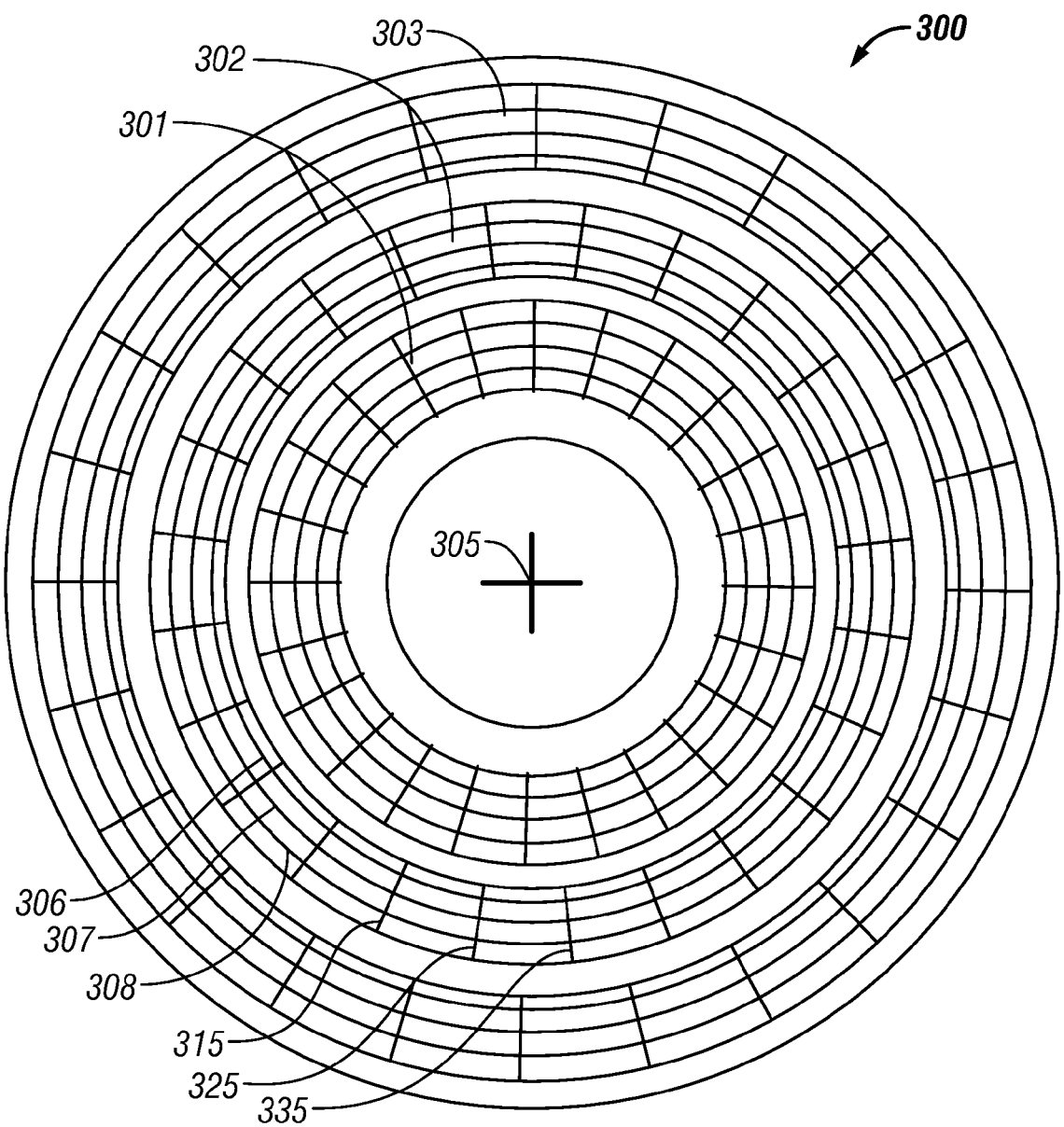
FIG. 13 is an illustration of a master mold showing the pattern of concentric rings in annular bands and the pattern of radially-directed pairs of lines in each band.
Figure 14:
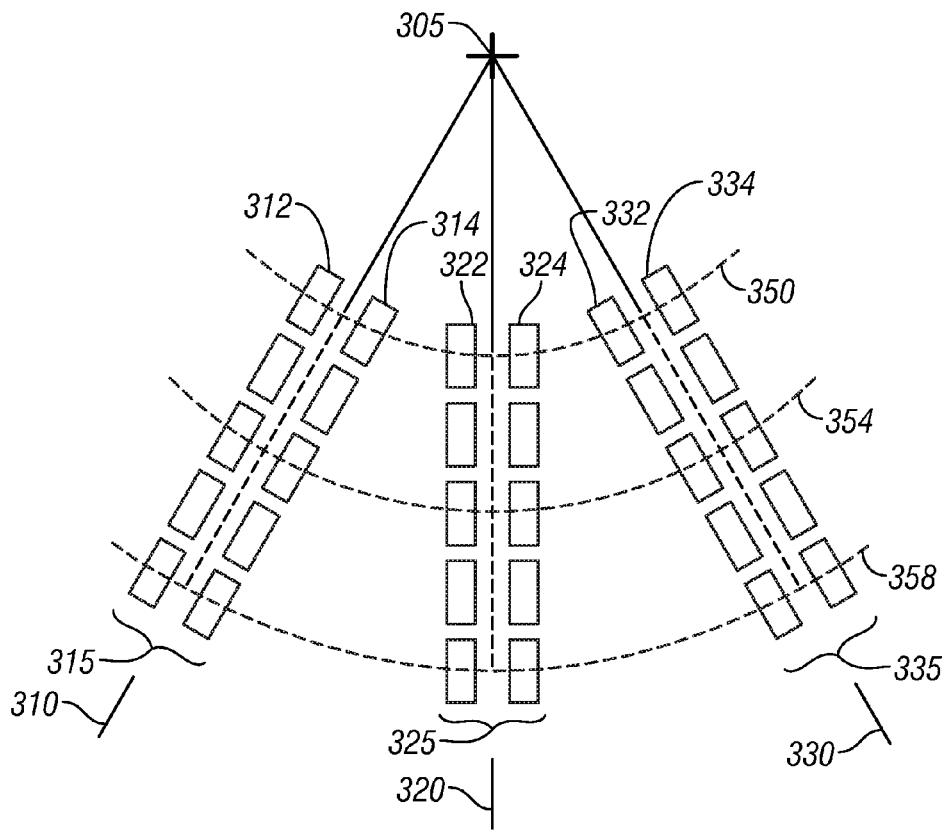
FIG. 14 is an expanded view of a portion of the master mold shown in FIG. 13 and shows a plurality of pillars arranged in five concentric rings.

The appearance of the pattern of pillars in FIGS. 12A-12B is for a very localized region and does not reveal the large-scale curvature of the concentric rings and radially-directed lines in the master mold. To give a better perspective of the pattern, FIG. 13 shows a master mold 300 with a center 305 and three annular zones or bands 301, 302, 303, with each band illustrating a few representative concentric rings and radially-directed pairs of lines, like rings 306, 307, 308 and line pairs 315, 325, 335 in band 302. The rings and line pairs represent the pattern of individual pillars (not shown). Because the sidewall lithography process creates a pair of lines parallel to and equidistantly spaced from a starting ridge, all radially-directed lines cannot be truly radial. This is illustrated in FIG. 14 which is an expanded view of a portion of the master mold shown in FIG. 13. FIG. 14 shows a plurality of pillars arranged in five concentric rings, including radially inner ring 350 and radially outer ring 358. The pillars are also arranged in a plurality of line pairs 315, 325, 335. Each line in a pair is equally spaced from a radius, like lines 312, 314 spaced from radius 310. The radii 310, 320, 330 coincide with the ridges that were used to deposit the sidewalls, with the ridges subsequently being removed during the fabrication process. Thus, as is apparent from FIG. 14, the lines in each pair are parallel, and thus not truly radial. As a result, the angular spacing of the pillars in the lines of a pair in the radially inner ring are not equally angularly spaced with the pillars in the radially outer ring, as shown by pillars in lines 312, 314 and inner ring 350 compared with the pillars in lines 312, 314 and outer ring 358. Also from FIG. 14 it is apparent that within each ring the spacing between pillars is not constant and increases with increasing radius.

In patterned-media disks, a relatively constant bit spacing is important for accurate write synchronization and readback detection. Standard disk drive data channel architectures assume a constant bit frequency passing by the head, and if the spacing is not constant, phase errors can occur. If the phase error due to sidewall lithography limitations becomes more than a few percent of the bit spacing, the errors may be unacceptable. However, in this invention, even though the sidewall lithography process results in the creation of parallel and not truly radial lines in the master mold, the master mold may be used to nanoimprint acceptable patterned-media disks. First, the angular spacing of the pillars can be made equal near the middle of a band, such as at ring 354 in FIG. 14. Thus, within each band, the difference in angular spacing between the pillars in the radially inner and outer rings of the band is reduced. Secondly, if the radial lines are kept short the difference in spacing is also reduced. This can be accomplished if a large number of bands are used. If a large enough number of bands is used, the amount of difference in spacing between the pillars in the radially inner and outer rings of the band can be small enough to not adversely affect reading and writing on the resulting nanoimprinted disks. Typical disk drives may use about 20 annular data bands. Depending on the size of the disk, this number or a smaller number of bands will result in an acceptable difference in pillar spacing so that the master mold made with sidewall lithography may be used.

The arrangement of pillars in the master mold portion of FIG. 14 would result in patterned-media disks with the magnetic islands arranged as shown in the prior art of FIG. 2A, with the exception that each island 30 would be generally rectangularly shaped with a IAR of about 2 or greater. Also, as explained above with respect to FIG. 2A, the islands may be arranged to form arcuate shaped lines in the radial direction.

Figure 15A:
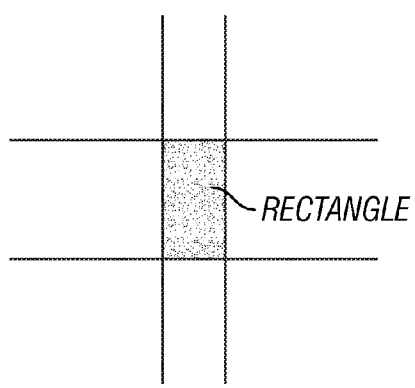
FIG. 15A illustrates a rectangular-shaped pillar that would be produced if radial ridges are used in the sidewall lithography step, resulting in disks having the data island pattern shown in FIG. 2A.
Figure 15B:
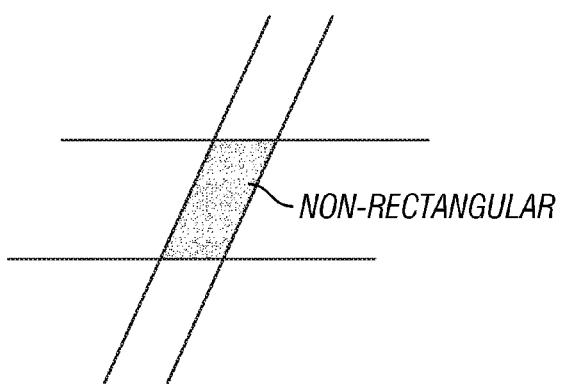
FIG. 15B illustrates a non-rectangular parallelogram-shaped pillar that would be produced if the generally radially-directed ridges used in the sidewall lithography step form arcuate shaped lines in the radial direction.

The pillars produced in the master mold by the method of this invention, i.e., sidewall lithography to form the pairs of generally radially-directed parallel lines and the conventional or e-beam lithography to form the concentric rings, are created by the intersections of lines. Thus the pillars will not have a generally circular shape. As can be seen in FIG. 15A, rectangular-shaped pillars would be produced if radial ridges are used in the sidewall lithography process, resulting in disks having the pattern of data islands shown in FIG. 2A. In FIG. 15B, non-rectangular parallelogram-shaped pillars would be produced if the generally radially-directed ridges used in the sidewall lithography process form arcuate shaped lines in the radial direction. The limits in pattern transfer resolution and in the various etching steps in making the master mold will result in a rounding off of the corners of the data islands, so the data islands would not have the precise shapes shown in FIGS. 15A-15B.

One implementation of the method of this invention for making the master mold was explained above with FIGS. 5A-5B through FIGS. 12A-12B. The preferred method of this invention for making the master mold will now be explained with respect to FIGS. 16A-16M. FIGS. 16A-16G and 16K-16M are side sectional views, at various stages of the fabrication method, taken through a plane generally perpendicular to the radial direction, and FIGS. 16H-16J are top views at various stages of the method.

Figure 16A:
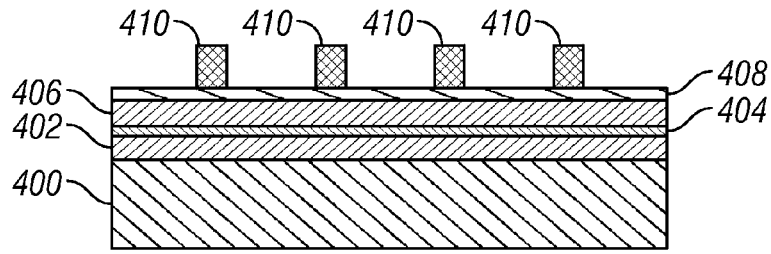
FIGS. 16A-16G are side sectional views, at various stages of the preferred method for making the master mold, taken through a plane generally perpendicular to the radial direction.
Figure 16B:
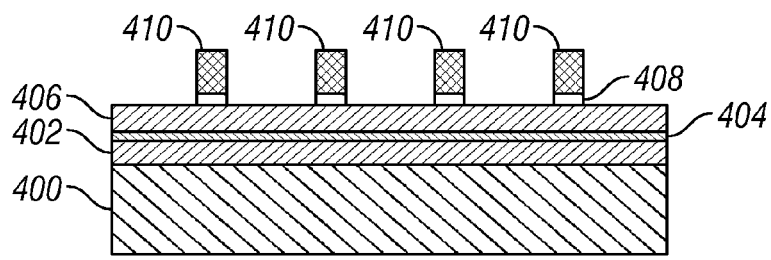
Figure 16C:
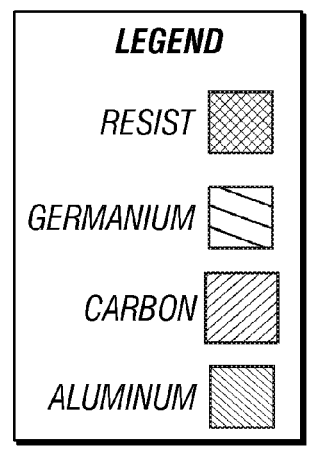
Figure 16C:
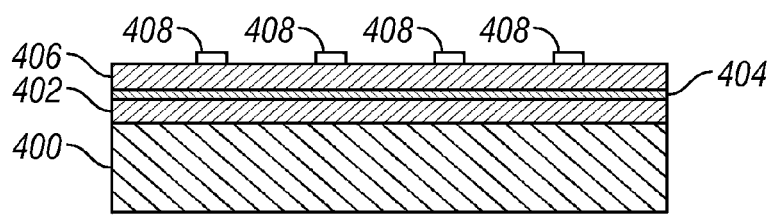
Figure 16D:
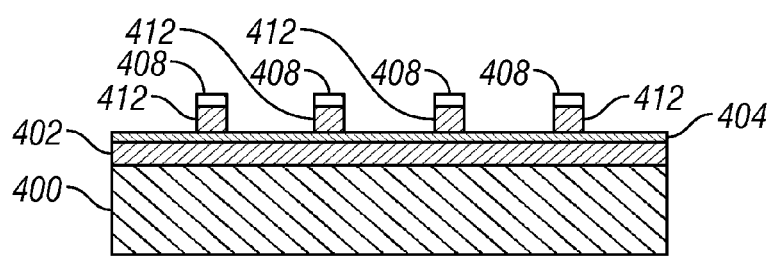
Figure 16E:
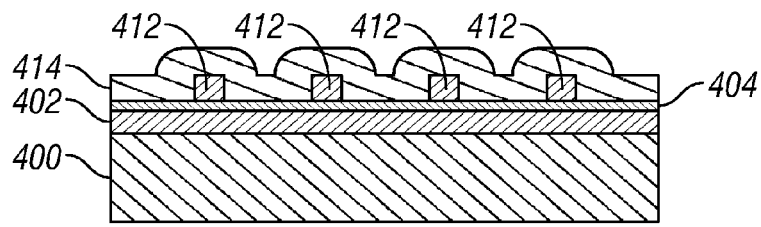
Figure 16F:
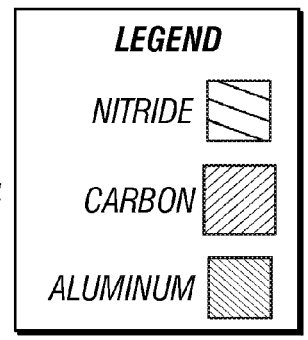
Figure 16F:
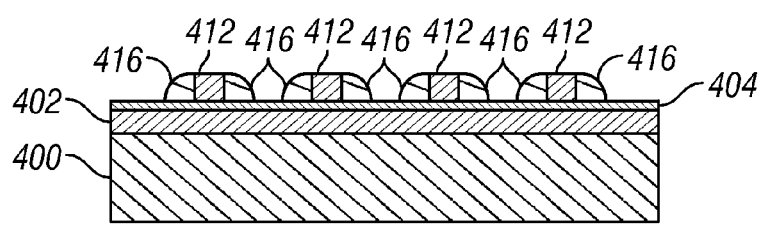
Figure 16G:
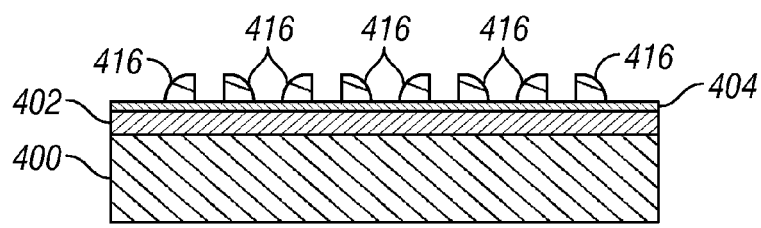
Figure 16H:
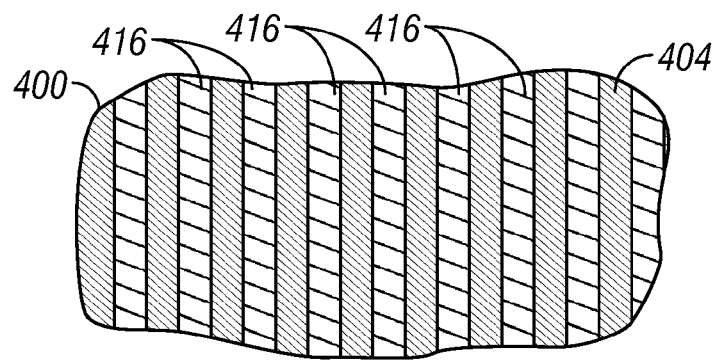
FIGS. 16H-16J are top views of the master mold at various stages of the preferred method for making the master mold.
Figure 16I:
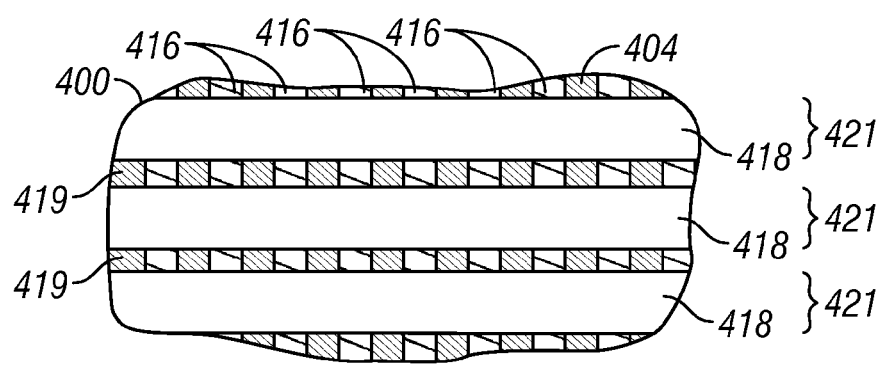
Figure 16J:
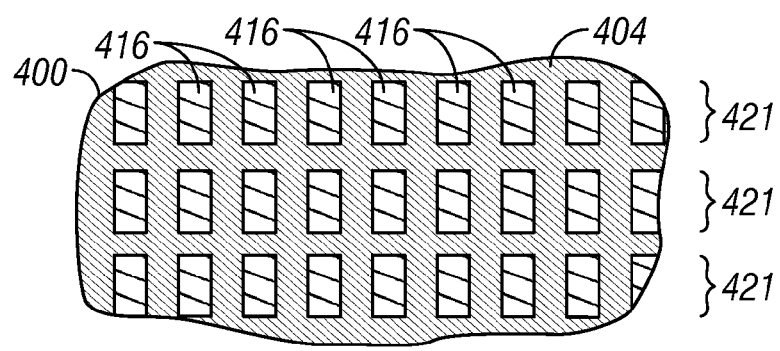
Figure 16K:
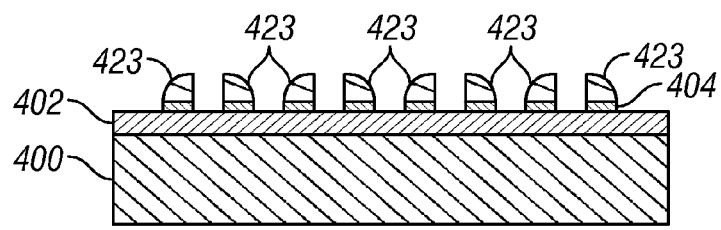
FIGS. 16K-16M are side sectional views, at various stages of the preferred method for making the master mold, taken through a plane generally perpendicular to the radial direction.
Figure 16L:
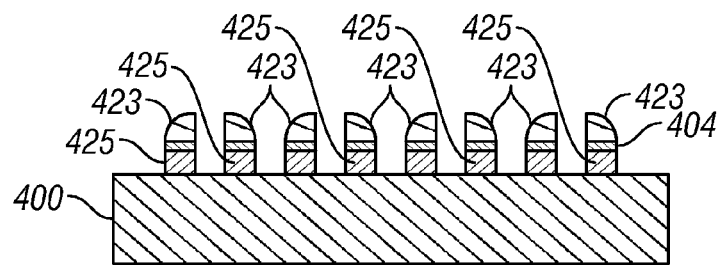
Figure 16M:
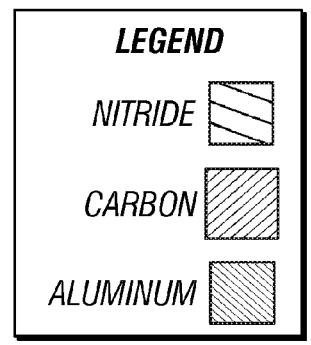
Figure 16M:
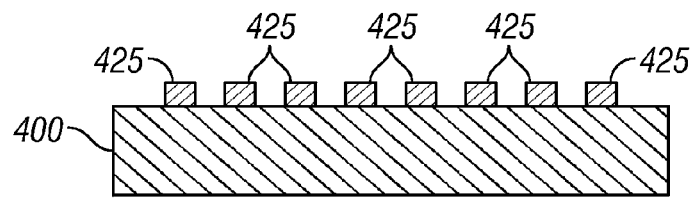

FIG. 16A shows the substrate as base 400, which may be formed of Si or $SiO_2$, with a substrate layer 402, which is preferably a 20 nm thick amorphous first carbon layer. An aluminum (Al) layer 404 having a thickness of about 10 nm is deposited on the carbon layer 402, and a second amorphous carbon layer 406 having a thickness of about 20 nm is deposited on second carbon layer 404. Then a layer of germanium (Ge) 408 having a thickness of about 5 nm is deposited on the second carbon layer 406. A layer of photoresist is then lithographically patterned on the Ge layer 408 to form a pattern of radial photoresist ridges 410. In FIG. 16B the pattern of radial photoresist ridges 410 is transferred into the Ge layer 408 by removal of the exposed Ge using a fluorine RIE process. In FIG. 16C the photoresist is removed, leaving a pattern of radial Ge ridges 408 on underlying second carbon layer 406. In FIG. 16D, the pattern of radial Ge ridges 408 is used as an etch mask to remove the exposed portions of second carbon layer 406 by an oxygen RIE process, exposing the underlying Al layer 404. This transfers the pattern of radial Ge ridges 408 into the underlying second carbon layer 406 and forms a pattern of radial carbon ridges 412 on underlying Al layer 404. At this stage of the method FIG. 16D corresponds generally to FIG. 4A. In FIG. 16E, the Ge ridges 408 are removed by a fluorine RIE process, and a layer of silicon nitride ($Si_3N_4$) 414 is deposited to a thickness of about 10 nm over the radial carbon ridges 412 and Al layer 404 between the ridges 412 by a chemical vapor deposition process. In FIG. 16F the portion of $Si_3N_4$ layer 414 above the radial carbon ridges 412 is removed by an anisotropic fluorine-based RIE process, leaving a pair of parallel $Si_3N_4$ strips 416 on the sidewalls of each carbon ridge 412. In FIG. 16G, the carbon ridges 412 are removed by an oxygen RIE process, leaving pairs of generally radially-directed $Si_3N_4$ strips 416 on the underlying Al layer 404. FIG. 16H is a top view showing the pairs of generally radially-directed $Si_3N_4$ strips 416 on the underlying continuous Al layer 404. At this stage of the method FIG. 16H corresponds generally to FIG. 4B. In FIG. 16I, the structure is coated with a layer of e-beam resist 418. The resist 418 is exposed in a rotary-stage e-beam tool to expose narrow concentric boundary regions 419 that correspond to the boundaries between the tracks of the disks to be nanoimprinted. The resist 418 may be a positive e-beam resist like poly methyl methacrylate (PMMA) or ZEP520A from Zeon Chemicals L.P. After developing, this will leave circumferential segments 421, which correspond to the tracks on the disks to be nanoimprinted, covered with resist 418 and the boundary regions 419 between segments 421 not covered with resist. In FIG. 16J, a fluorine-based reactive-ion-etch (RIE) is used to etch the exposed $Si_3N_4$ in the boundary regions 419. Then the resist 418 is removed in a wet etch process, like hot N-methyl pyrrolidone (NMP), or a dry etch process, like oxygen RIE. This leaves $Si_3N_4$ pillars 423 arranged in circumferential segments 421 on underlying Al layer 404. In FIG. 16K, the $Si_3N_4$ pillars 423 are used as an etch mask to etch the exposed Al layer 404 by a chlorine-based RIE or by ion beam etching with an inert or reactive gas, leaving the $Si_3N_4$ pillars 423 with the substrate layer (first carbon layer 402) between the $Si_3N_4$ pillars 423. In FIG. 16L, the $Si_3N_4$ pillars 423 are used as an etch mask to etch the exposed first carbon layer 402, leaving carbon pillars 425 beneath the $Si_3N_4$ pillars 423. Then, in FIG. 16M the portions of Al layer 404 between the $Si_3N_4$ pillars 423 and the carbon pillars 425 are removed by a fluorine RIE process, which lifts off the $Si_3N_4$ pillars 423, leaving a pattern of carbon pillars 425 on substrate base 200. The carbon pillars 425 have a IAR of greater than about 4. The resulting structure in FIG. 16M corresponds generally to FIG. 4C. The structure of FIG. 16M, which began as a substrate of base 400 and first carbon layer 402, has now been etched so that a portion of the substrate remains as the topographic pattern in the form of carbon pillars 425. The structure of FIG. 16M can function as the master mold with the carbon pillars 425 functioning as the topographic pattern for nanoimprinting the replica molds. As an alternative approach, the carbon pillars 425 in FIG. 16M can function as an etch mask for an additional etching step to etch the underlying substrate base 400. After etching and removal of the carbon pillars 425 in this alternative approach, the result would be a master mold like that depicted in FIGS. 12-12B wherein the pillars are formed of the same material as the substrate base 400.

The sidewall lithography process in FIGS. 16A-16M can be repeated to create radial lines with a circumferential density quadruple the circumferential density of the radial ridges in FIG. 4A. In the repeat process, the first ridges are primary ridges and the first strips are primary strips that are used as an etch mask to form secondary ridges. Secondary strips are formed on the sidewalls of the secondary ridges, after which the secondary ridges are removed, leaving secondary strips that are four times the number of primary ridges. For example, to double the circumferential density of the final carbon pillars 425 from that shown in FIG. 16M, the process would start as in FIG. 16A, but with a second carbon layer and second aluminum layer formed between substrate 400 and carbon layer 402. The process then proceeds as shown to FIG. 16M, but skipping the steps of FIGS. 16H-16J that form the circumferential segments 421 which correspond to the tracks on the disks to be nanoimprinted. Instead, the process shown in FIGS. 16E-16G is repeated. Then the circumferential segments 421 are defined as in FIGS. 16H-6J. The original ridges 410 in FIG. 16A would have a circumferential width of 3F/4 and the $Si_3N_4$ strips 416 would have a circumferential width of F/4 so that after the second sidewall process the strips 416 would be F/4 wide with a circumferential pitch of F/2. For an e-beam circumferential pitch of 40 nm to pattern the ridges 410 and a BAR of 4, the areal density would then be about 1.6 Terabits/$in^2$.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned-media magnetic recording disk comprising: a substrate having a plurality of magnetic islands arranged about a center point, the islands being arranged into a plurality of annular bands of concentric circular tracks about said center point, the islands in each band being arranged into a plurality of generally radially-directed non-parallel pairs of parallel lines wherein the islands in the parallel lines in each pair are equally circumferentially spaced in all tracks of a band, the pairs of lines being generally equally angularly spaced about said center point, wherein the ratio of radial spacing of the concentric tracks to the circumferential spacing of the islands is the bit-aspect-ratio (BAR) and is greater than 1.

2. The disk of claim 1 wherein the islands in a circular track generally at the middle of each band are generally equally angularly spaced about said track.

3. The disk of claim 1 wherein the radially inner ends of the pairs of lines have the same equal angular spacing about said center as the radially outer ends of the pairs of lines.

4. The disk of claim 1 wherein each pair of lines is aligned along a radius from said center.

5. The disk of claim 1 wherein each pair of lines has a generally arcuate shape.

* * * * *